United States Patent
Bhatia et al.

(10) Patent No.: US 8,903,844 B2
(45) Date of Patent: *Dec. 2, 2014

(54) PROVIDING EFFECTIVE INTERACTIVE QUERY SUGGESTIONS WITHOUT QUERY LOGS

(75) Inventors: Sumit Bhatia, State College, PA (US); Debapriyo Majumdar, Kolkata (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/598,262

(22) Filed: Aug. 29, 2012

(65) Prior Publication Data
US 2012/0323952 A1    Dec. 20, 2012

Related U.S. Application Data

(63) Continuation of application No. 13/094,995, filed on Apr. 27, 2011.

(51) Int. Cl.
*G06F 17/30*    (2006.01)

(52) U.S. Cl.
CPC .............................. *G06F 17/30389* (2013.01)

USPC .......................................................... 707/767

(58) Field of Classification Search
CPC ................................................ G06F 17/30389
USPC .................................................. 707/766, 767
See application file for complete search history.

(56) References Cited

U.S. PATENT DOCUMENTS

2012/0030226 A1* 2/2012 Holt et al. ...................... 707/766
2012/0179705 A1* 7/2012 Kumaran et al. ............. 707/767

* cited by examiner

*Primary Examiner* — Huawen Peng
(74) *Attorney, Agent, or Firm* — Ference & Associates LLC

(57) ABSTRACT

Methods and arrangements for providing interactive query suggestions. A partial user query phrase is received, the partial query phrase comprising a final word element. A vocabulary is accessed and, from the vocabulary, at least one possible completion of the final word element is ascertained. A phrase index is accessed and, from the phrase index, at least two phrases corresponding to completions of the partial user query phrase with the at least one possible completion of the final word element are ascertained. A probability score is assigned to each of the at least two phrases, and the at least two phrases are ranked based on probability.

6 Claims, 4 Drawing Sheets

PROVIDING EFFECTIVE INTERACTIVE QUERY SUGGESTIONS WITHOUT QUERY LOGS

CROSS REFERENCE TO RELATED APPLICATION

This application is a continuation of U.S. patent application Ser. No. 13/094,995, entitled METHODS AND ARRANGEMENTS FOR PROVIDING EFFECTIVE INTERACTIVE QUERY SUGGESTIONS WITHOUT QUERY LOGS, filed on Apr. 27, 2011, which is incorporated by reference in its entirety.

BACKGROUND

Conventionally, in searching paradigms, interactive query suggestions have proven to be useful. Commercial web-search engines have query logs, and often these form the basis of suggestions for queries as the user types. However, it is not always feasible to include or employ a query log, thus often depriving users of suggestions as they might normally expect.

BRIEF SUMMARY

In summary, one aspect of the invention provides a method comprising: receiving a partial user query phrase, the partial query phrase comprising a final word element; accessing a vocabulary; ascertaining, from the vocabulary, at least one possible completion of the final word element; accessing a phrase index; ascertaining, from the phrase index, at least two phrases corresponding to completions of the partial user query phrase with the at least one possible completion of the final word element; assigning a probability score to each of the at least two phrases; and ranking the at least two phrases based on probability.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
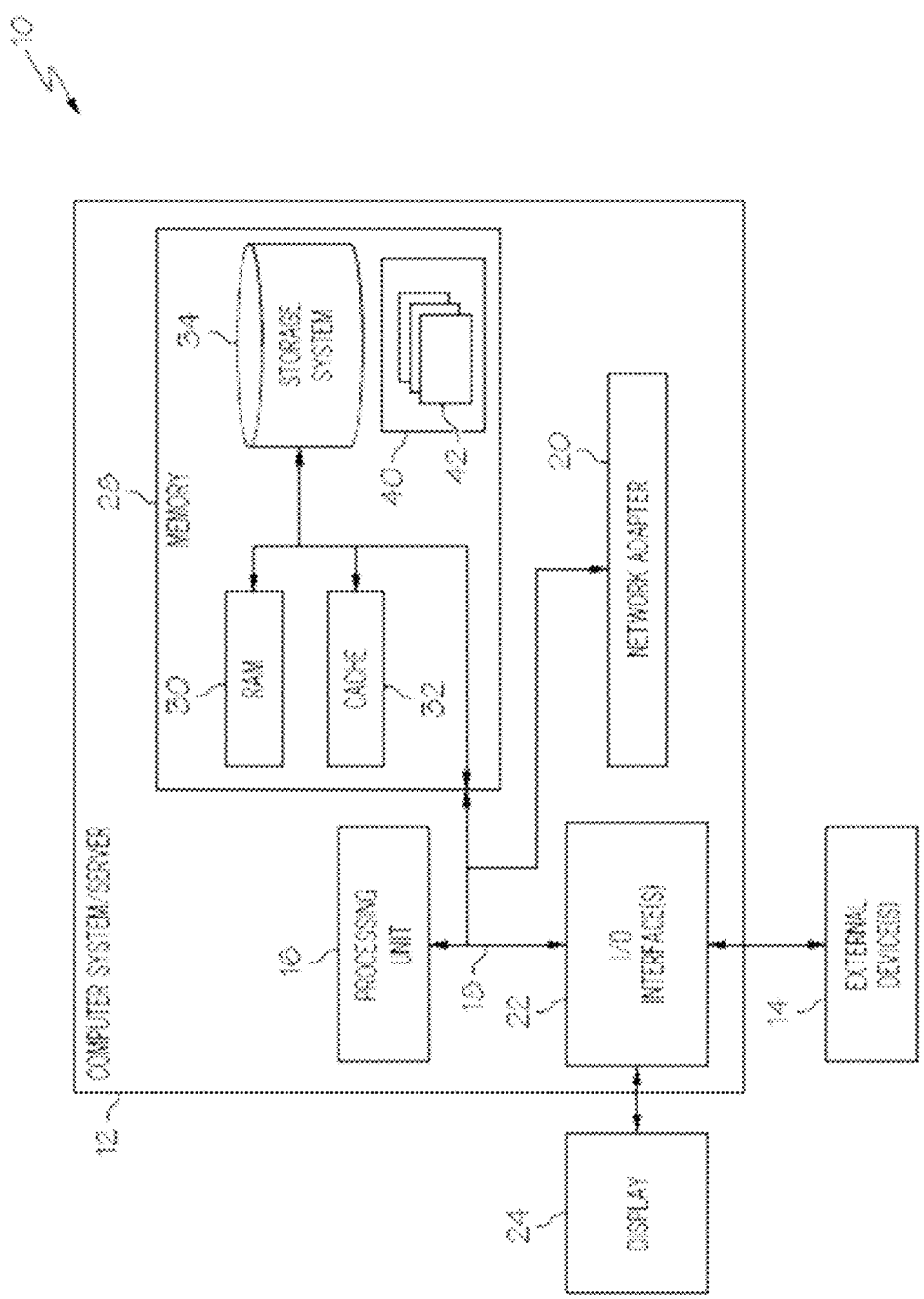
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor or processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, at least one application program, other program modules, and program data. Each of the operating system, at least one application program, other program modules, and program data or some combination thereof, may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enable a user to interact with computer system/server 12; and/or any devices (e.g., network card, modem, etc.) that enable computer system/server 12 to communicate with at least one other computing device. Such communication can occur via I/O interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
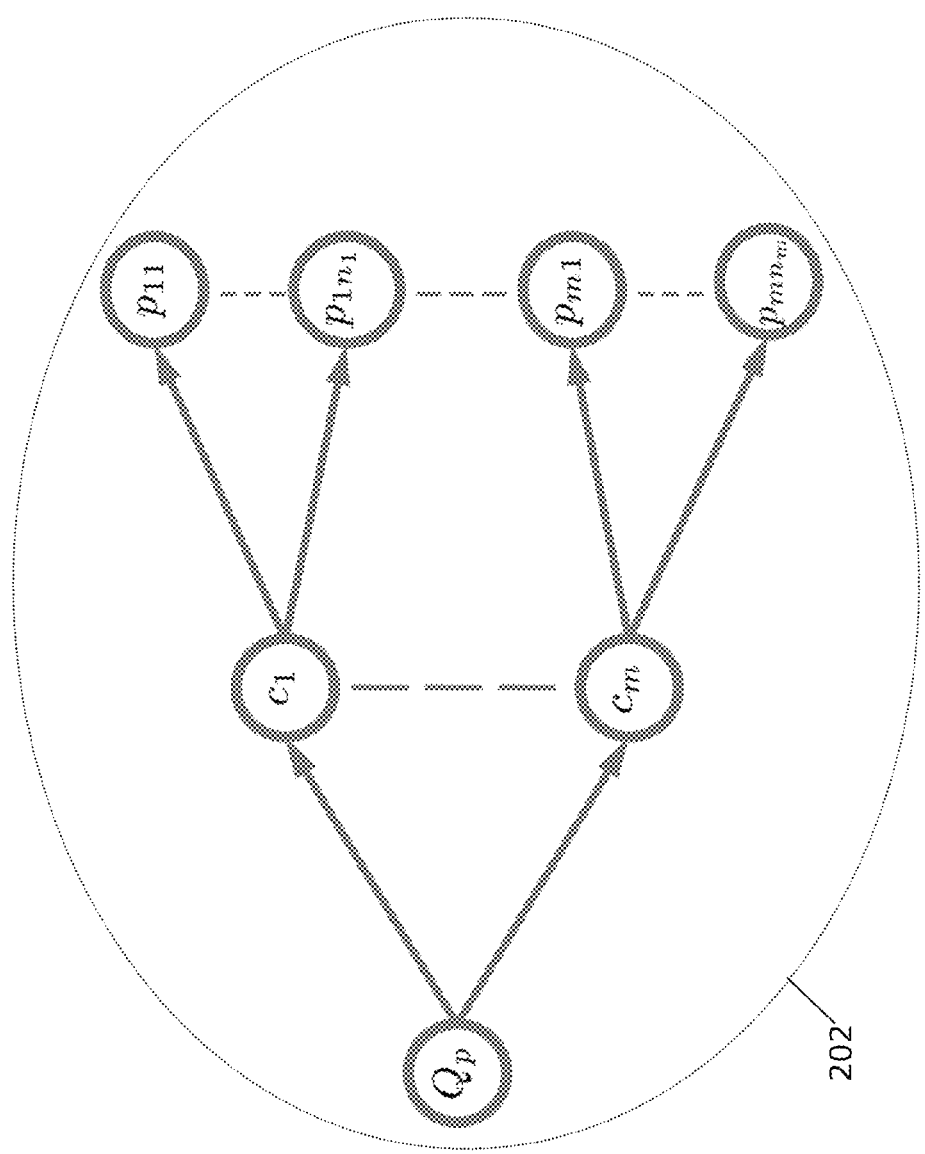
FIG. 2 illustrates a graphical model for completing a partial word in a query FIG. 3 schematically depicts a query suggestion arrangement.
Figure 3:
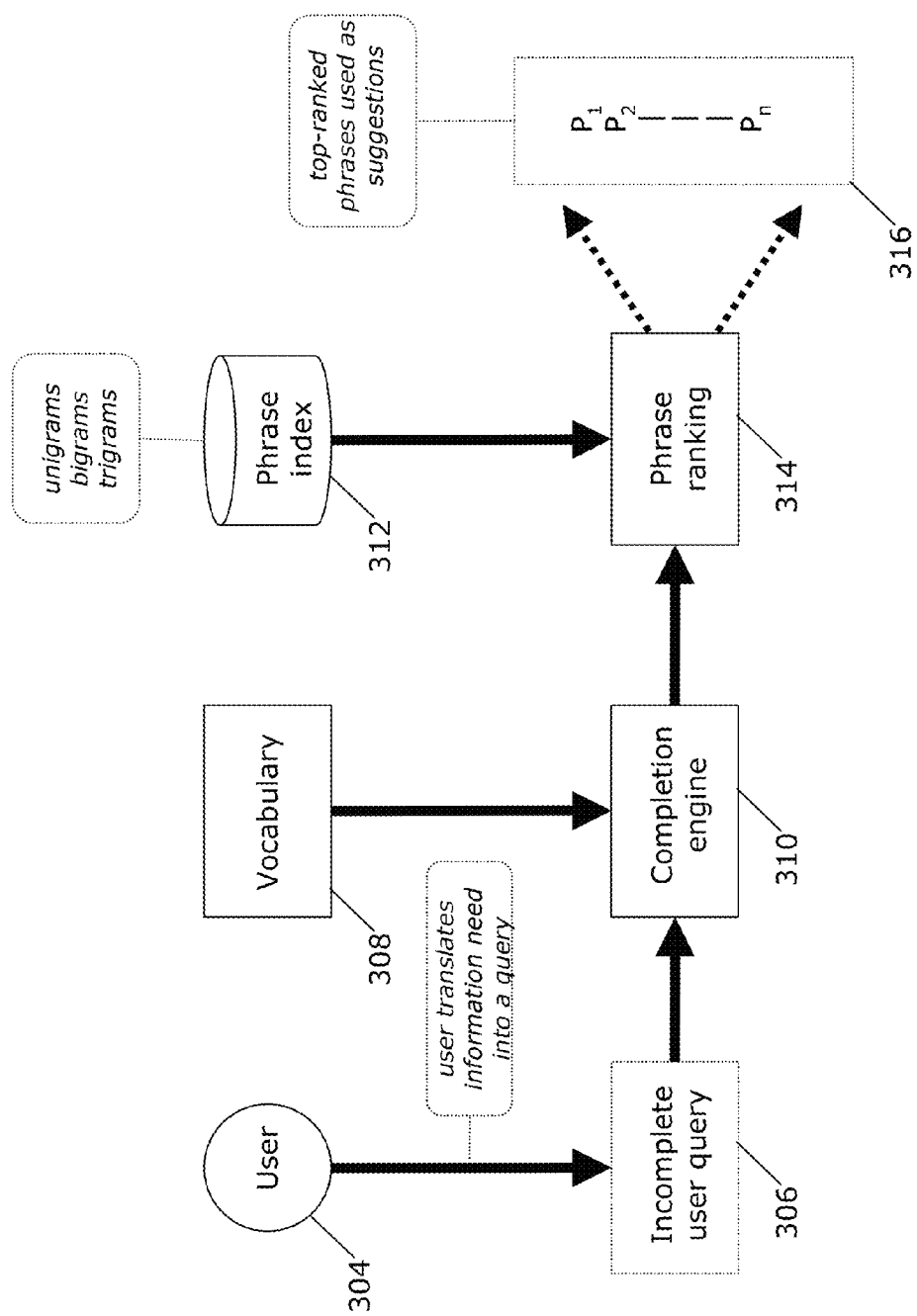

The disclosure now turns to FIGS. 2 and 3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2 and 3 can be performed or utilized by way of a processing unit or units and system memory such as those indicated, respectively, at 16 and 28 in FIG. 1, whether on a server computer, a client computer, a node computer in a distributed network, or any combination thereof.

At the end of this disclosure is an Appendix, containing equations labeled with numbers (1) through (14). Herebelow, reference is made variously to those equations by number.

Consider a user who has an information need. He/she transforms the information need into a query and starts typing the query in the query box of a search engine. The user has some information need but is not sure what terms to use to formulate a query. Since the documents indexed by the search engine are not visible to the user, often the terms selected by the user to formulate the queries do not lead to good retrieval performance due to the gap between query-term space and document-term space. To help the user, an information retrieval system can search the query logs to identify queries similar to the user's query that have been successful in the past and can suggest such queries to the user. However, this is of little use where query logs are not available.

In the absence of query logs, there is broadly contemplated herein, in accordance with at least one embodiment of the invention, a document-centric approach that utilizes documents in the corpus itself to generate query suggestions on the fly. Phrases from the document corpus are indexed and extracted, and when the user starts typing a query, the phrases are utilized to complete the partial user query. The completed queries are then offered as suggestions to the user.

In accordance with at least one embodiment of the invention, in order to create a database of phrases that can be used for completing partial user queries, all N-grams of order 1, 2 and 3 (that is unigrams, bigrams and trigrams) are extracted from the document corpus. One can also extract higher order N-grams but the number of possible N-grams increases exponentially with the order N and, hence, is not scalable for any real world corpus. Further, while extracting N-grams, attention is paid to stop words. Consider the phrase "president of usa." Each of the possible bi-grams from this phrase ("president of", "of usa") starts or ends with a stop word and is, thus, an incomplete phrase and not desirable as query completions.

One possible solution can be to remove all the stop-words from corpus before extracting N-grams. However, removing stop-words may also lead to loss of semantics and make the resulting suggestions harder to understand. For example, compare "president usa" with "president of usa" and "president in usa." If one removes the stop-words, the second and third phrase will both reduce to the first phrase even though they mean different things. In order to avoid such difficulties, in accordance with at least one embodiment of the invention, instead of skipping over and discarding the adjacent words, whenever a stop-word is encountered there is a jump over to the next word, and the stop-word is retained. Accordingly, the resulting phrases do not start or end with stop words. Thus, in the above example, there will only be one bi-gram ("president of usa"). Note that now the order of an N-gram is not the number of words in the N-gram, but the number of non stop-words.

In accordance with at least one embodiment of the invention, consider the time instant when the user has typed the first k characters. These characters can contain a space character and, if so, that conveys that the user has typed more than one query term. Let $P=\{p_1, p_2, \ldots, p_n\}$ denote the set of extracted phrases that can be used for generating query suggestions and let V be the vocabulary of the corpus available. Given the incomplete query $Q_1^k$, V and P, an objective is to construct a set $S \subset P$ such that each $s \in S$ is a possible completion for $Q_1^k$. As such, the only information available about the user is the incomplete query $Q_1^k$. Further, different users having different information needs can start with same $Q_1^k$. For example, the queries "linux interview questions" and "linux installation" have the same prefix "linux in." Thus, for a given partial query $Q_1^k$, in accordance with at least one embodiment of the invention an objective involves, selecting phrases that can be used for generating possible query suggestions. To solve this problem, the question is posed: "Given a partial query $Q_1^k$ and a phrase $p_i \in P$, what is the probability $P(p_i|Q_1^k)$, i.e., the probability that the user will eventually type $p_i$ after typing $Q_i^k$?" Once the above question is answered, phrases can be ordered by the probability of their being typed after $Q_1^k$, with the top ranked phrases being used for offering suggestions to the user. The disclosure, accordingly, now turns to a description of computing $P(p_i|Q_1^k)$. Reference may now be made to the Equations (1)-(14) contained in the Appendix.

In accordance with at least one embodiment of the invention, an observation is made that at any given instant of time, $Q_1^k$ can be decomposed as found in Equation (1), where $Q_C$ denotes the completed portion of the query, i.e., the set of words that the user has typed completely. Note that $|Q_C| \geq 0$. $Q_t$ is the last word of $Q_1^k$ that the user is still typing. Note that it may be a complete word or a partial word. Further, $|Q_t| \in \{0, 1\}$. Using Bayes' theorem, the probability $P(p_i|Q_1^k)$ can be written as shown in Equation (2). Further, assuming that the query terms are conditionally independent, Equation (3) results.

Using Equations (2) and (3), a result is Equation (4), where $Q_t$ and $Q_C$ are as defined in Equation (1). By the definition of joint probability, Equation (5) results, while an application of Equation (4) to Equation (5) yields Equation (6). Further, it can be noted that $Q_1^k$ and $Q_t$ remain the same for all phrases, given a user-submitted partial query. Therefore, $P(Q_t)$ and $P(Q_1^k)$ are constants for a given user query and, thus, can be safely ignored since the interest here is the relative ordering of phrases.

Taking these observations into account, Equation (6) reduces to Equation (7), where $P(p_i|Q_t)$ represents the phrase selection probability and $P(Q_C|p_i)$ represents the phrase-query correlation.

Equation (7) summarizes a model for query suggestion, in accordance with at least one embodiment of the invention. The first component of Equation (7) measures the probability that phrase $p_i$ can be typed by the user given that he/she has already typed $Q_t$. The second component measures the correlation between $p_i$ and component $Q_C$ of the user query. The disclosure now turns to how these two components can be estimated.

In accordance with at least one embodiment of the invention, selecting a candidate phrase given a partial word is a two step process. First, a completion of the partial word is found and then a phrase is selected that contains that completed word. FIG. 2 illustrates this process in terms of a graphical model 202 that can be used to estimate $P(p_i|Q_t)$. The root node corresponds to the event that the user has typed $Q_t$, or a partial word. This partial word can be completed in m different ways where m is the number of words in vocabulary that start with $Q_t$. Let $C=c_1, \ldots, c_m$ be the set of m such possible word completions represented by corresponding nodes in FIG. 2.

Continuing, let $P_i = p_{i1}, \ldots, p_{1n_i}$ be the set of $n_i$ phrases that contain the completed word $c_i$. Given $Q_t$, each completion $c_i$ has a probability $P(c_i|Q_t)$ of being selected. Once $c_i$ is selected as a possible word completion, there is selected a phrase $p_{ij} \in P_i$ with the probability $P(p_{ij}|c_i)$. In this way, the probability of selecting a phrase given a partial word is expressed as found in Equation (8), where $P(c_i|Q_t)$ represents the term completion probability and $P(p_{ij}|c_i)$ represents the term to phrase probability.

In accordance with at least one embodiment of the invention, since there is no further information about a user's need except for the partial word $Q_t$, a simplifying assumption is made. Particularly, it is assumed that phrases in the corpus that are more important have a higher chance of being used by the user for formulating queries than the less important ones. One way to assess the importance of phrases is by ascertaining their occurrence frequencies in the corpus. However, this naïve approach has two shortcomings.

In a formulation in accordance with at least one embodiment of the invention, a first step in phrase selection is to find a completion c of the last query word $Q_t$ with a probability $P(c|Q_t)$ and then select all phrases that contain that completion. If only raw frequencies are used to compute $P(c|Q_t)$, some of the important, but rare, completions will get suppressed. Hence, while computing $P(c_i|Q_t)$, normalization is undertaken where the frequencies of different completions by their IDF values as follows.

In general, the frequency of unigrams in the corpus is much higher than the frequency of bigrams and trigrams. Such large differences in frequency values suppresses the selection of bigrams and trigrams as compared to unigrams. In accordance with at least one embodiment of the invention, a normalization factor is employed that normalizes raw frequencies of different order n-grams using the log ratio of their average frequencies as shown in Equation (10), where avgFreq(m) is the average frequency of all n-grams of order m.

Using this formulation, in accordance with at least one embodiment of the invention, the term to phrase probability can be computed as shown in Equation (11). On the other hand, the phrase selection component of Equation (7) selects phrases on the basis of the last query word ($Q_t$) only. It does not take into account the context in which the user has typed $Q_t$. For example, consider following two partial queries: "bill gate" and "india gate." The first query is related to Bill Gates and the second query is about a historical monument in India. For both these queries, the last word is same and therefore, one could end up with the same set of phrases for both these queries even though they represent very different information needs. Accordingly, it is desirable to identify whether a given phrase is contextually important or not.

In accordance with at least one embodiment of the invention, the second component of Equation (7) takes into account such a relationship between a phrase and the user-submitted query. It represents the probability that the user has typed $Q_C$ given that one knows that the selected phrase $p_i$ represents the completion of $Q_C$. In other words, given that $p_i$ represents the latter half or portion of the complete query, an objective then is to compute the probability that $Q_C$ is the first half or portion of the complete query.

Accordingly, in accordance with at least one embodiment of the invention, by using the laws of probability, $P(Q_C|p_i)$ can be written as shown in Equation (12). Here, $P(Q_C|p_i)$ represents the probability of the joint occurrence of $Q_C$ and $p_i$ and $P(p_i)$ represents the probability of observing $p_i$ alone. Both these probabilities can be estimated using the corpus as shown in Equation (13).

Here, $D_{p_i}$ and $D_{Q_C}$ represent the sets of documents that contain phrase $p_i$ and $Q_C$ respectively. In order to find the set of documents containing a particular phrase p, in accordance with at least one embodiment of the invention, a simplifying assumption is made, and $D_p$ is approximated as the set of documents that contain all the constituent words in phrase p. Mathematically, Equation (14) follows, where $D_w$ is the set of documents containing word w.

This approximation has two important advantages. First, it greatly simplifies finding the set $D_p$ as all the required sets of documents containing the constituent words (i.e., $D_w$'s in Equation (14)) are already available in the search engine's index in the form of posting lists of respective words. Second, it helps overcome a data-sparseness problem. For example, consider the following three queries: "linux install firefox," "install firefox linux" and "firefox install linux." All these queries represent the same information need and are represented using the same set of terms. However, the ordering of the constituent terms is different in all three queries. Thus, it is possible that the phrases present in the corpus may have a different ordering than what the user has typed and thus, one will miss such phrases. Further, in the relevant documents these terms might not always appear together as a phrase. However, decomposing a phrase into its constituent terms avoids the above problems. By such a formulation, phrases that contain terms that co-occur frequently with the user query are given a higher weight. It also helps in making sure that the resulting query suggestions have good retrieval capability as the resulting query suggestions will include terms that frequently co-occur.

FIG. 3 schematically depicts a query suggestion arrangement, in accordance with at least one embodiment of the invention, and in the context of the mathematical framework set forth herein. Given a user 304 executing an incomplete query 306 ($Q_1^k$ herein), the process, via a completion engine 310, first draws on vocabulary 308 to find all the possible completions of the last query word ($Q_l$ herein). These completions are then used to identify a set of phrases ($p_i$ herein, and taken from index 312) that can be used for generating possible query suggestions. All the phrases in this candidate set are then assigned a probability score ($P(p_i|Q_1^k)$; see Equation (7)), and accordingly ranked (314). A predetermined number of higher-ranked phrases 316 (e.g., the top ten) are then presented to the user after appending to the $Q_C$ portion of the user query (i.e., the portion of the user query preceding the final element or word).

Figure 4:
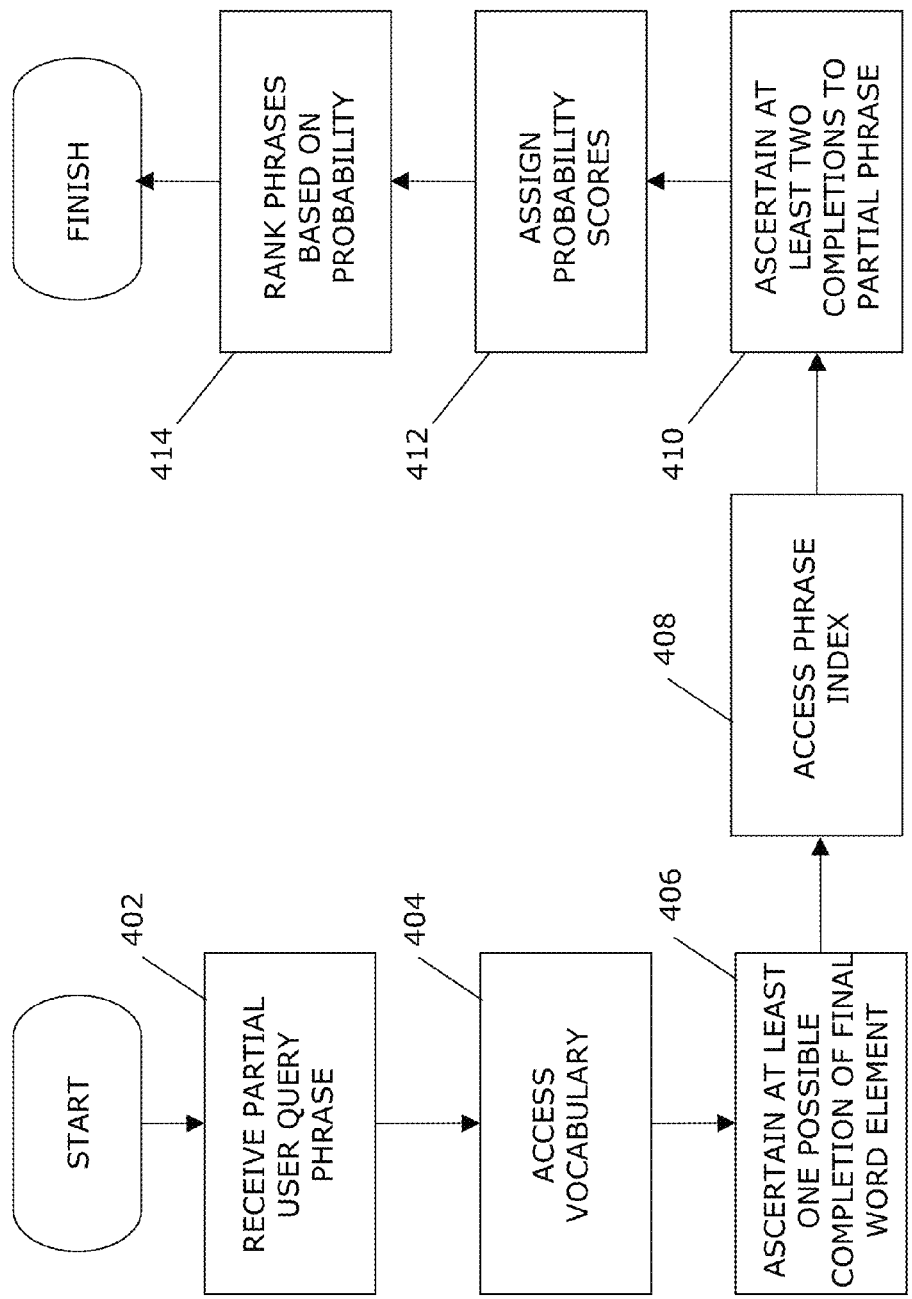
FIG. 4 sets forth a process more generally for providing interactive query suggestions.

FIG. 4 sets forth a process more generally for providing interactive query suggestions, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 4 can be performed by way a processing unit or units and system memory such as those indicated, respectively, at 16 and 28 in FIG. 1.

As shown in FIG. 4, a partial user query phrase is received (402), the partial query phrase comprising a final word element. A vocabulary is accessed (404) and, from the vocabulary, at least one possible completion of the final word element is ascertained (406). A phrase index is accessed (408) and, from the phrase index, at least two phrases corresponding to completions of the partial user query phrase with the at least one possible completion of the final word element are ascertained (410). A probability score is assigned to each of the at least two phrases (412), and the at least two phrases are ranked based on probability (414).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

APPENDIX (Equations)

$$Q_1^k = Q_c + Q_t \tag{1}$$

$$P(p_i \mid Q_1^k) = \frac{P(p_i) \times P(Q_1^k \mid p_i)}{P(Q_1^k)} \tag{2}$$

$$P(Q_1^k \mid p_i) = P(Q_t \mid p_i) \times P(Q_c \mid p_i) \tag{3}$$

$$P(p_i \mid Q_1^k) = \frac{P(p_i) \times P(Q_t \mid p_i) \times P(Q_c \mid p_i)}{P(Q_1^k)} \tag{4}$$

$$P(p_i)P(Q_t \mid p_i) = P(p_i, Q_t) = P(Q_t)P(p_i \mid Q_t). \tag{5}$$

$$P(p_i \mid Q_1^k) = \frac{P(Q_t)P(p_i \mid Q_t)P(Q_c \mid p_i)}{P(Q_1^k)} \tag{6}$$

$$P(p_i \mid Q_1^k) \stackrel{rank}{=} \underbrace{P(p_i \mid Q_t)}_{\text{phrase selection probability}} \times \underbrace{P(Q_c \mid p_i)}_{\text{phrase-query correlation}} \tag{7}$$

$$P(p_{ij} \mid Q_t) = \underbrace{P(c_i \mid Q_t)}_{\text{term completion probability}} \times \underbrace{P(p_{ij} \mid c_i)}_{\text{term to phrase probability}} \tag{8}$$

$$P(c_i \mid Q_t) = \frac{freq(c_i) \times IDF(c_i)}{\sum_{i=1}^{m} freq(c_m) \times IDF(c_m)} \tag{9}$$

$$freq_{norm}(\text{order } m \text{ } n\text{-gram } p) = \frac{freq(p)}{\log(avgFreq(m))} \tag{10}$$

$$P(p_{ij} \mid c_i) = \frac{freq_{norm}(p_{ij})}{\sum_{k=1}^{n_t} freq_{norm}(p_{ki})} \tag{11}$$

$$P(Q_c \mid p_i) = \frac{P(Q_c, p_i)}{P(p_i)} \tag{12}$$

$$P(Q_c \mid p_i) = \frac{|D_{Q_c} \cap D_{p_i}|}{|D_{p_i}|} \tag{13}$$

$$D_p \approx \bigcap_{w \in p} D_w \tag{14}$$

What is claimed is:

1. A method comprising:

receiving a partial user query phrase, the partial query phrase comprising a final word element;

accessing a vocabulary;

ascertaining, from the vocabulary, at least one possible completion of the final word element;

accessing a phrase index derived from a document corpus;

ascertaining, from the phrase index, at least two phrases corresponding to completions of the partial user query phrase with the at least one possible completion of the final word element;

assigning a probability score to each of the at least two phrases; and ranking the at least two phrases based on probability;

wherein said assigning of a probability score comprises determining a phrase selection probability, the phrase selection probability corresponding to the probability that a given phrase from the phrase index represents a completion of the partial query phrase given the final word element;

wherein said assigning of a probability score comprises determining a phrase-query correlation, the phrase-query correlation corresponding to a measurement of correlation between a given phrase from the phrase index and that portion of the partial query phrase preceding the final word element; and wherein the phrase-query correlation comprises a function of a probability of observing a phrase from the phrase index alone and of a probability of a joint occurrence between a phrase from the phrase index and the portion of the partial query phrase preceding the final word element.

2. The method according to claim 1, wherein the vocabulary is derived from a document corpus.

3. The method according to claim 1, wherein said determining of a phrase selection probability further comprises determining normalized frequencies of the at least two phrases as possible completions of the partial user query phrase.

4. The method according to claim 3, wherein said determining of normalized frequencies comprises applying a logarithmic modifier to raw frequencies of the at least two phrases, the logarithmic modifier biasing against unigrams.

5. The method according to claim 1, wherein said determining of a phrase-query correlation comprises decomposing the portion of the partial query phrase preceding the final word element into constituent elements, and determining the probability of joint occurrence based on frequencies of the constituent elements.

6. The method according to claim 5, wherein:

said assigning of a probability score further comprises determining a phrase selection probability, the phrase selection probability corresponding to the probability that a given phrase from the phrase index represents a completion of the partial query phrase given the final word element;

said determining of a phrase selection probability further comprises determining normalized frequencies of the at least two phrases as possible completions of the partial user query phrase; and said determining of normalized frequencies comprises applying a logarithmic modifier to raw frequencies of the at least two phrases, the logarithmic modifier biasing against unigrams.

\* \* \* \* \*